United States Patent [19]
Miller

[11] Patent Number: 5,393,470
[45] Date of Patent: Feb. 28, 1995

[54] PROCESS FOR MANUFACTURING OPTICAL FIBERS

[76] Inventor: Jack V. Miller, 700 N. Auburn Ave., Sierra Madre, Calif. 91024

[21] Appl. No.: 63,770

[22] Filed: May 20, 1993

[51] Int. Cl.⁶ .............................................. B29C 47/06
[52] U.S. Cl. .................... 264/1.29; 264/147; 264/162; 264/210.1; 264/174; 264/DIG. 47; 427/412.1
[58] Field of Search ............... 264/1.5, 147, DIG. 47, 264/1.4, 210.1, 280, 284, 162, 174; 427/412.1

[56] References Cited

U.S. PATENT DOCUMENTS

| | | | |
|---|---|---|---|
| 2,728,950 | 1/1956 | Annesser | 264/147 |
| 3,470,285 | 9/1969 | Kim et al. | 264/147 |
| 3,736,217 | 5/1973 | Nagno | 264/1.5 |
| 4,083,914 | 4/1978 | Schippers et al. | 264/147 |

FOREIGN PATENT DOCUMENTS

| | | | |
|---|---|---|---|
| 48-2696 | 1/1973 | Japan | 264/147 |

*Primary Examiner*—Mathieu D. Vargot

[57] ABSTRACT

A process for manufacturing optical fibers includes extruding a transparent thermoplastic plastic sheet having plurality of transversely shaped and spaced parallel grooves extending in the longitudinal direction of extrusion. The thermoplastic sheet is rolled between polished rollers having upstanding circumferential ribs matching the shape and spacing of the grooves in the thermoplastic sheet. The rollers separate the extruded thermoplastic sheet into a plurality of elongated fibers and polish and cool the separated fibers. A preferred embodiment includes a first extruding die extruding said thermoplastic sheet having an index of refraction and a second extrusion die applying a co-extruded coating of plastic having an index of refraction lower than the index of refraction of the transparent sheet. The ribs of the polished rollers form various channel shapes that may produce optical fibers in both circular and non-circular cross-sectional shapes.

14 Claims, 3 Drawing Sheets

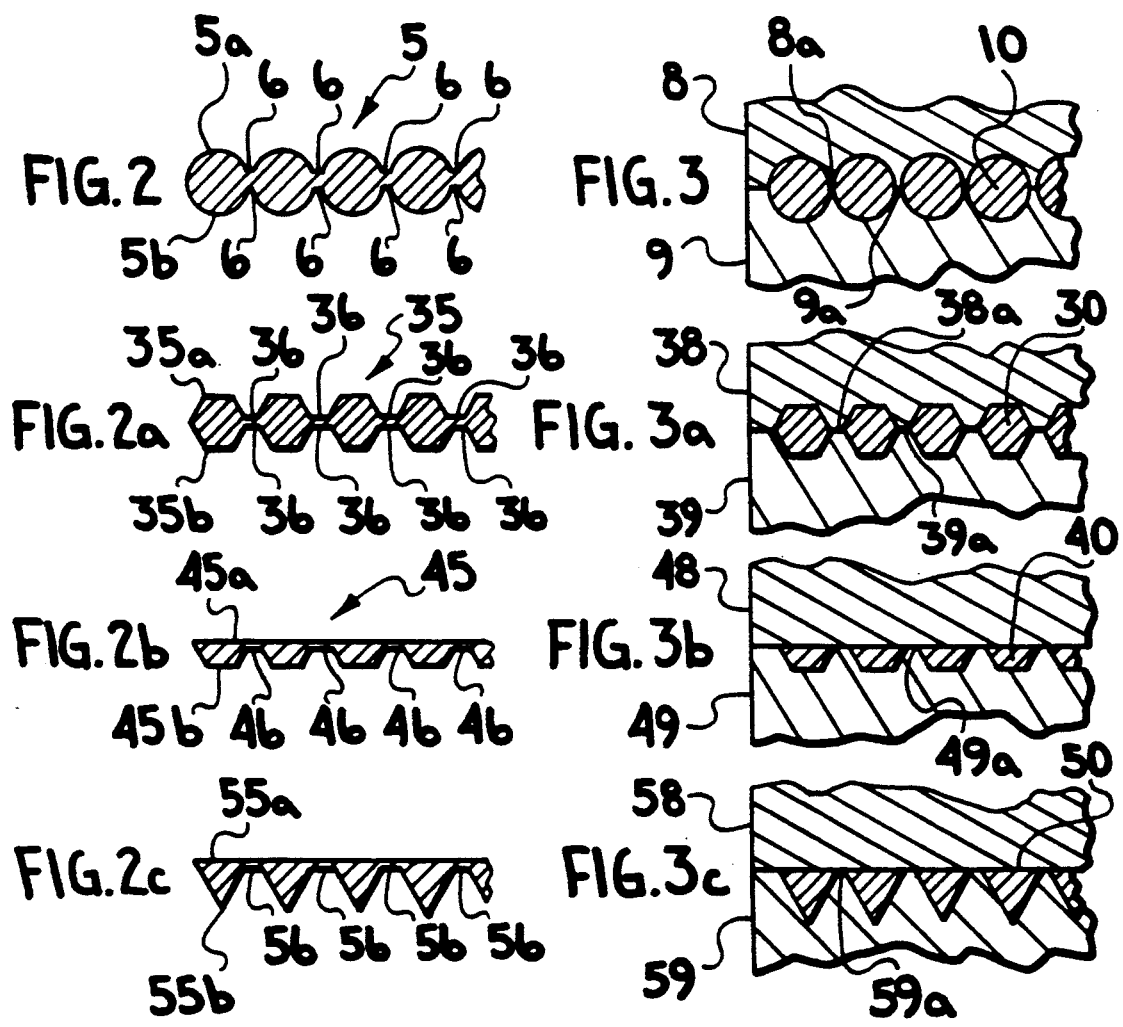
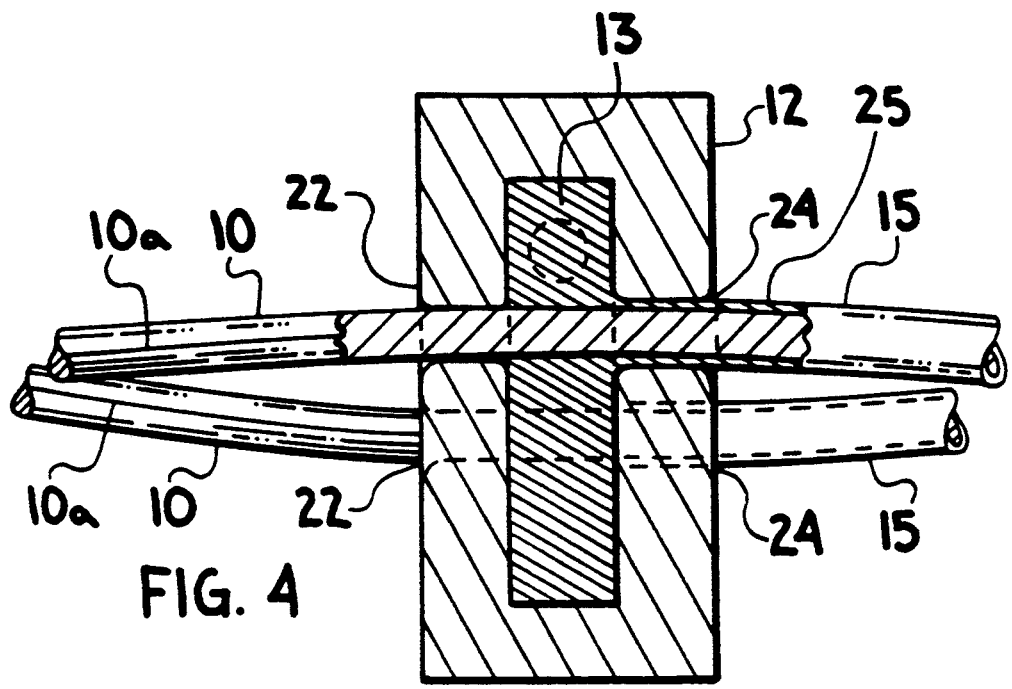

PROCESS FOR MANUFACTURING OPTICAL FIBERS

BACKGROUND OF THE INVENTION

This invention applies to the field of optical fiber manufacturing, and in particular to manufacturing thermoplastic optical fibers having a low refractive index cladding over a thermoplastic core of a higher index of refraction. Such fibers as large as 3 mm in diameter are finding use in display and sign illumination, as they are capable of transmitting high light levels. The ability of these relatively large diameter fibers to transmit enough light to produce useful levels of visible illumination without any infrared or ultraviolet energy makes them ideal for display lighting in such applications as museums and retail stores. Presently-known plastic optical fibers are manufactured by one of two different and relatively expensive processes.

In one such manufacturing method individual fibers are "drawn" from miniature dies from which a polymethyl methacrylate (acrylic) core and a fluorinated polymer cladding are simultaneously drawn at a fairly slow rate. Plastic fibers are thus manufactured in a continuous process very much like glass fibers have been made for many years. The transmissivity of the fibers is partially dependent on flaws or density variations in the core material, and by surface flaws at interface at the surface of "total" internal reflection between the core and the cladding. Since the fibers are partly extruded from the die and partly drawn from it, variations in both density and diameter are produced by the slight variations in speed of drawing. Also, the very small-diameter holes in the dies through which the fibers are drawn must be drilled with either diamonds or lasers, and it is difficult to produce smooth, highly-polished holes. Thus any slight flaw or imperfection in the drawing die aperture is replicated in the drawn fiber and may cause a surface imperfection that functions as a light leak out of the core, whereby the internal reflection becomes less than total. This method for drawing optical fibers is a slow and precise process, and the resulting cost of clad acrylic plastic fibers of 2 mm to 3 mm diameter needed for display illumination is presently in excess of $60 per pound of finished fiber material.

A second presently-used process for manufacturing plastic optical fibers produces what is know as "solid-core" fibers, in which a core of very soft and flexible polymer is extruded into a sheath of a fluorocarbon plastic which in part traps an air film about the core to provide the low index of refraction cladding. Solid core fiber extrusion has all the manufacturing errors of clad acrylic fibers for the core, but additionally has a similar set of manufacturing errors for the pre-extruded sheath, requiring highly-polished small diameter surfaces for both the core and the sheath dies. As a result, solid core fibers are normally less transmissive than clad acrylic fibers of the same diameter and length. Further, the solid core process produces light guides of limited length, as it is not a continuous process. Thus, manufacturing solid core fibers is an even more expensive process than acrylic fiber drawing. The cost of producing fibers of 3 mm diameter for display lighting is typically $250 per pound of 3 mm diameter core material.

The manufacturing flaws and high costs of plastic optical fiber extrusion have been significantly reduced in other optical plastic extrusion processes, such as those used for manufacturing prismatic light control lens sheets for the fluorescent fixture industry. Light control lenses having linear prisms are extruded in sheet or profile forms, much like optical fibers are extruded from acrylic polymers such as those used for optical fibers, but from a wide extrusion die instead of a small hole. Such profile dies are also difficult to polish perfectly, so the linear-prism extrusions typically have optical flaws inherent in manufacturing, which are similar to those of extruded optical fibers.

Extrusion flaws in prismatic extrusions are substantially removed in the manufacturing process for pyramidal-prismatic lens sheets for fluorescent lighting fixtures. Light control sheets of this type are typically made by a machine in which a flat extruded thermoplastic sheet, often up to four feet wide, is continuously extruded from an extrusion press. While the extruded sheet is still plastic, it passes between a pair of highly-polished embossing rollers having prismatic embossing patterns thereon. The rollers apply the embossed pyramidal prismatic surfaces to the soft, extruded sheet. The rollers emboss, polish, cool and rigidize the plastic sheet, forming a continuous prismatic sheet that is then sawn into rectangular panels for installation into fluorescent light fixtures. This is a high-speed process, in which the large-diameter rollers produce very accurate and highly-polished surfaces on the plastic. Prismatic lighting panel sheets of acrylic plastics are thus very inexpensively manufactured by this process, and are normally sold at a cost of less than $2 per pound.

The primary purpose of the present invention is to provide a manufacturing method for optical fibers that is a high-speed, high-volume process with the quality and cost advantages of pyramidal prismatic lighting sheet manufacturing, is combined with new rolling and cladding techniques to produce clad acrylic optical fibers at a significantly lower cost than presently-known fiber optics manufacturing methods.

SUMMARY OF THE PRESENT INVENTION

The achievement of the foregoing purposes of the invention is accomplished by the present invention for a process for manufacturing optical fibers, including extruding a transparent thermoplastic plastic in the form of a substantially flat extrusion having plurality of transversely shaped and spaced optical fibers, which are mutually connected in parallel grooves across the width of the extrusion, the grooves extending in the longitudinal direction of extrusion.

This process of the present invention uses a modification of existing machinery used in the production of pyramidal prismatic lighting diffusers, in which the thermoplastic sheet is rolled between polished rollers having upstanding circumferential ribs matching the shape and spacing of the grooves in the thermoplastic sheet. The rollers separate, polish and cool the thermoplastic extrusion into the form of a plurality of elongated fibers.

A preferred embodiment includes a first extruding die extruding said thermoplastic sheet having an index of refraction and a second extrusion die applying a coating of plastic having an index of refraction lower than the index of refraction of the transparent sheet. The ribs form various channel shapes that may produce optical fibers in both circular and non-circular cross-sectional shapes which may be either symmetrical or non-symmetrical.

BRIEF DESCRIPTION OF THE DRAWINGS

FIG. 2 is a transverse cross-sectional view of FIG. 1, taken along section line 2—2;

FIGS. 2a through 2c are alternate embodiments of FIG. 2;

FIG. 3 is a transverse cross-sectional view of FIG. 1, taken along section line 3—3;

FIGS. 3a through 3c are alternate embodiments of FIG. 3.

FIG. 4 is a longitudinal cross-sectional view of FIG. 1, taken along section line 4—4;

DETAILED DESCRIPTION OF THE DRAWINGS

Figure 1:
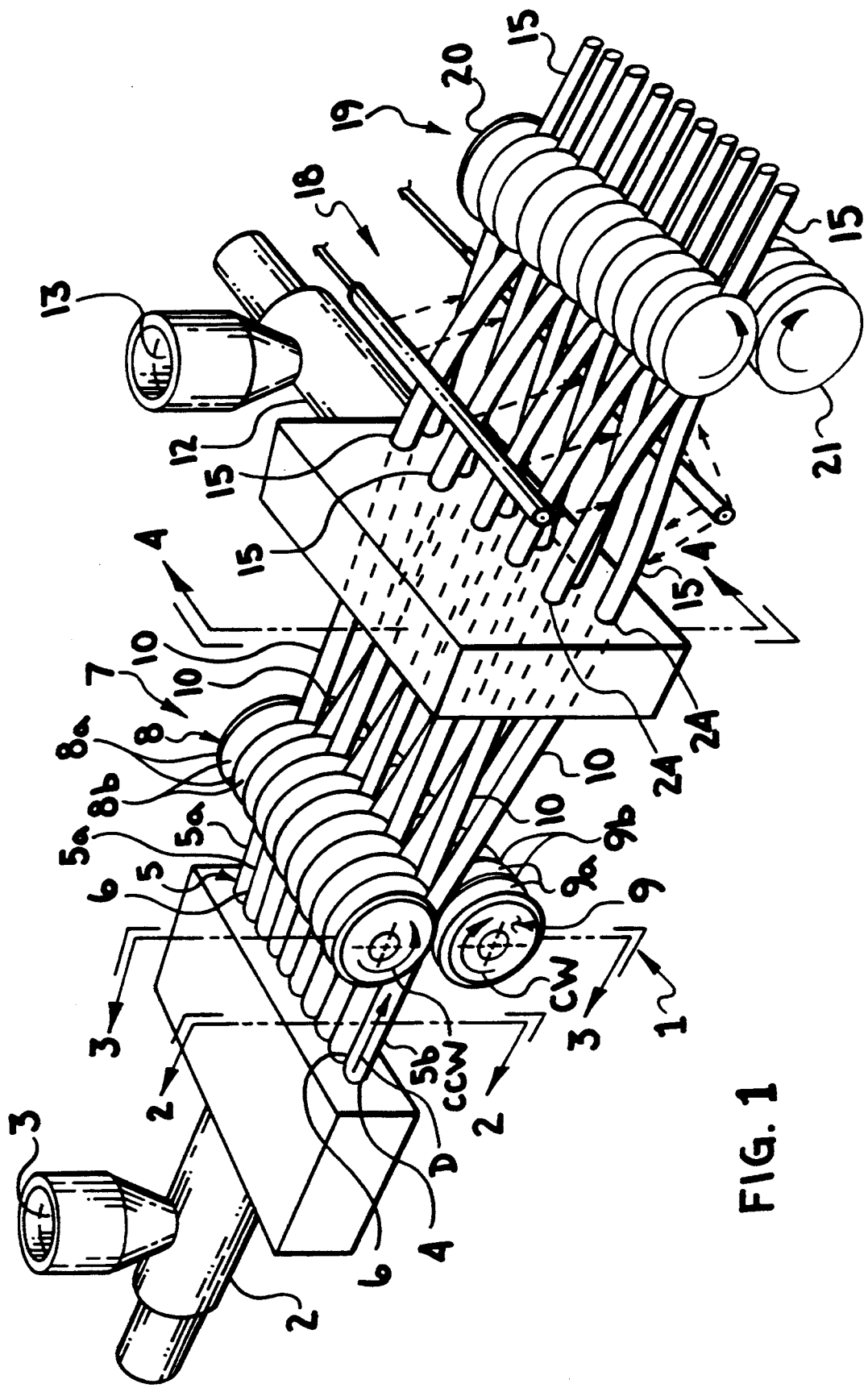
FIG. 1 is a perspective view of the first embodiment of the process for manufacturing optical fibers according to the invention.

In FIG. 1 a process 1 for manufacturing optical fibers according to the present invention is shown having a first extrusion die means including an extruder 2 injecting a transparent core polymer 3, such as acrylic or styrenic plastic, through an extrusion die 4 which is so configured to extrude a generally planar sheet 5 having a first surface 5a and second surface 5b including a plurality of transversely shaped and spaced parallel grooves 6 extending in the longitudinal direction D of the extrusion and forming a planar array of connected fibers having geometrically-shaped cross-sections. Polished roller means 7 includes a first polished roller 8 and a second polished roller 9 rolling and imparting a polished surface to extrusion 5, at least one of rollers 8 or 9 having upstanding circumferential ribs 8a or 9a matching the shape and spacing of the grooves 6 in the extrusion, each rib of said first roller 8 contacting the second roller 9, thereby forming a geometrically-shaped channel 8b or 9b, imparting a polished surface to the fibers and parting the connected fibers into a plurality of separate elongated fibers 10 having polished and geometrically-shaped cross-sections.

The extrusion die means includes a second extruder 22 injecting a cladding polymer 13, having a lower index of refraction than core polymer 3, through a plurality of extrusion dies 14, so configured to form clad fibers 15.

Cladding polymer 13 may form a coating of thermosetting plastic which is cured by electromagnetic radiation from a curing accelerator 18 which may apply any of various electromagnetic radiation wavelengths, including ultraviolet or infrared energy to accelerate curing of polymer 13. It is not necessary to roller-polish the exterior of cladding polymer 13, as the optical interface is inside the cladding, against the fiber core 10.

Optionally a second roller means 19, comprising rollers 20 and 21, may be included to cool and rigidize the clad fibers 15.

In FIG. 2 an enlarged partial cross-section of a preferred embodiment of extrusion 5 is shown having a generally planar configuration having a first surface 5a and second surface 5b including a plurality of transversely shaped and spaced parallel grooves 6 in the extrusion, forming a planar array of connected fibers having substantially round cross-sections.

In FIG. 3 an enlarged partial cross-section of a preferred embodiment of extrusion 5 of FIG. 2 is shown formed by first polished roller 8 having upstanding ribs 8a and second polished roller 9 having upstanding ribs 9a in contact with ribs 8a of roller 8, so as to separate the planar array of connected fibers of extrusion 5 of FIG. 2 into separate fibers 10 having substantially round cross-sections separated along parting lines at the respective junctures of the rollers.

In FIG. 2a an enlarged partial cross-section of a second preferred embodiment of extrusion 35 is shown having a planar first surface 35a and second surface 35b including a plurality of transversely shaped and spaced parallel grooves 36 in the extrusion, forming a planar array of connected fibers having substantially hexagonal cross-sections.

In FIG. 3a an enlarged partial cross-section of the second preferred embodiment of extrusion 35 of FIG. 2a is shown having a planar first surface 35a and second surface 35b including a plurality of transversely shaped and spaced parallel grooves 36 in the extrusion, formed by first polished roller 38 having upstanding ribs 38a and second polished roller 39 having upstanding ribs 39a in contact with ribs 38a of roller 38, so as to separate the planar array of connected fibers of extrusion 35 of FIG. 2a into separate fibers 30 having substantially hexagonal cross-sections.

In FIG. 2b an enlarged partial cross-section of a second preferred embodiment of extrusion 45 is shown having a planar first surface 45a and second surface 45b including a plurality of transversely shaped and spaced parallel grooves 46 in the extrusion, forming a planar array of connected fibers 40 having substantially trapezoidal cross-sections.

In FIG. 3b an enlarged partial cross-section of the second preferred embodiment of extrusion 45 is shown having a planar first surface 45a and second surface 45b including a plurality of transversely shaped and spaced parallel grooves 46 in the extrusion, formed by first polished roller 48 having upstanding ribs 48a and second polished roller 49 having upstanding ribs 49a in contact with ribs 48a of roller 48, so as to separate the planar array of connected fibers of extrusion 45 of FIG. 2b into separate fibers 40 having substantially trapezoidal cross-sections.

In FIG. 2c an enlarged partial cross-section of a third preferred embodiment of extrusion 55 is shown having a planar first surface 55a and second surface 55b including a plurality of transversely shaped and spaced parallel grooves 56 in the extrusion, forming a planar array of connected fibers having substantially triangular cross-sections.

In FIG. 3c an enlarged partial cross-section of a third preferred embodiment of extrusion 55 of FIG. 2c is shown having a planar first surface 55a and second surface 55b including a plurality of transversely shaped and spaced parallel grooves 56 in the extrusion, formed by first polished roller 58 having upstanding ribs 58a and second polished roller 59 having upstanding ribs 59a in contact with ribs 58a of roller 58, so as to separate the planar array of connected fibers of extrusion 55 of FIG. 2c into separate fibers 50 having substantially triangular cross-sections. It is sometimes desired to have fibers that emit light along one side of their length. This is accomplished by including a textured surface on one of the roller surfaces, such as 35a, 45a or 55a, to produce a light refracting and diffusing texture on the fiber.

In FIG. 4 the longitudinal cross-sectional view of FIG. 1, taken along section line 4—4 is shown having polymer 13 of lower index of refraction than the core fibers 10, applied by extruder 12 to form clad fibers 15. Extruder 12 includes a plurality of entrance dies 22 which loosely guide fibers 10 into cladding polymer 13, except along parting lines 10a, which are smoothed and polished by dies the entrance 22. Extruder 12 also includes a plurality of exit dies 24 which apply a thin coating 25 cladding polymer 13 to core fibers 10, producing clad fiber 15.

Figure 5:
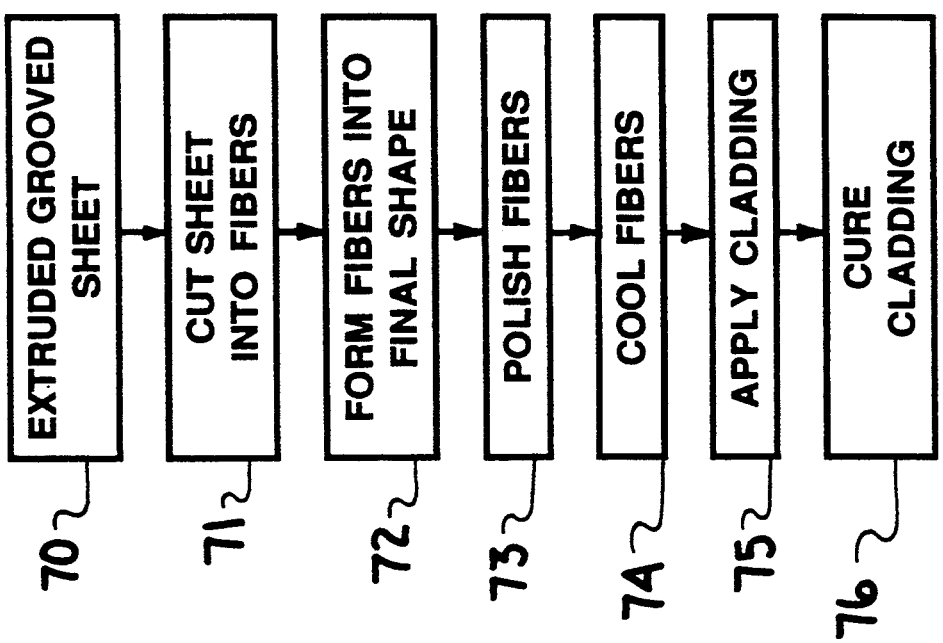
FIG. 5 is a schematic flow diagram of the process of FIG. 1.

In FIG. 5 a schematic flow diagram of the process of FIG. 1 is shown in which the manufacturing process includes the following operations: Extrude Grooved Sheet 80; Cut Grooved Sheet Into Fibers 71; Form Fiber Into Final Shape 72; Polish Fibers 73; Cool Fibers 74; Apply Cladding 75; and Cure Cladding 76.

Figure 6:
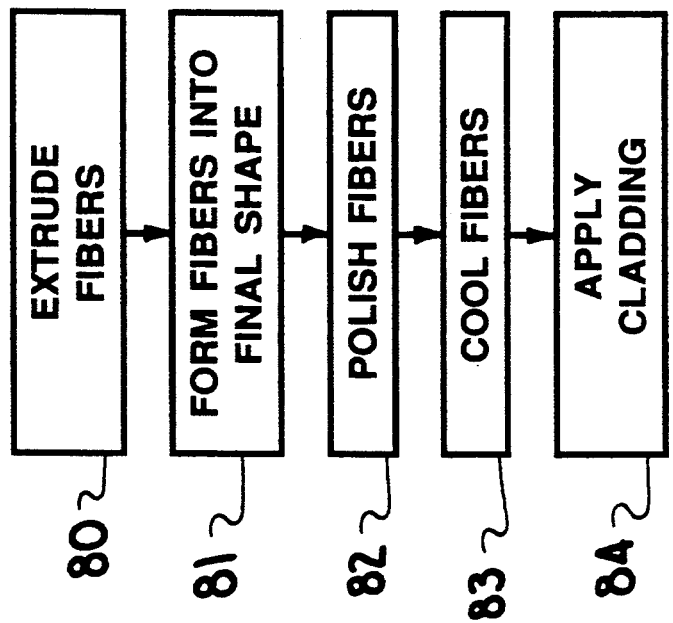
FIG. 6 is a schematic flow diagram of a simplified alternate embodiment of the process of FIG. 5.

In FIG. 6 a schematic flow diagram of a simplified alternate embodiment of the process of FIG. 5 is shown in which the manufacturing process includes the following operations: Extrude Fibers 80; Form Fibers Into Final Shape 81; Polish Fibers 82; Cool Fibers 83; and Apply Cladding 84.

The foregoing description of a process for manufacturing optical fibers is adapted from the most efficient and low cost processes for manufacturing prismatic light control lens sheets for the fluorescent fixture industry in a new combination with the techniques for producing optical fibers. By the combination of steps in the present invention the difficulty in producing small-diameter individual fiber drawing dies that are flaw-free is overcome, by transferring the finishing process to large rollers that may be highly polished, thus producing a superior finish on the fibers in a high-speed process.

By simultaneous extrusion and rolling in a 48-inch-wide extrusion press, as many as 350 fibers of 3 mm diameter may be made, thereby reducing the manufacturing cost of optical fibers to near that of producing embossed prismatic sheets. Further, the process of the present invention is capable of producing fibers of sharp-cornered geometric shapes, such as hexagons, trapezoids and triangles, which form bundles substantially without interstices, providing for more efficient acceptance of illumination.

I claim:

1. A process for manufacturing optical fibers including:
    a step of extruding using extrusion die means producing transparent thermoplastic material in the form of a sheet extrusion having first and second surfaces wherein at least one of said surfaces includes a plurality of transversely shaped and spaced parallel grooves extending in the longitudinal direction of the extrusion and forming a planar array of connected fibers having geometrically-shaped cross-sections;
    a step of rolling using polished roller means including first and second polished rollers rolling and imparting a polished surface to the extrusion, at least one of said rollers having upstanding circumferential ribs matching the shape and spacing of the grooves in the extrusion, each rib of said first roller contacting the second roller, thereby forming a geometrically-shaped channel imparting a polished surface to the fibers and parting the connected fibers into a plurality of separate elongated fibers having polished and geometrically-shaped cross-sections.

2. A process for manufacturing optical fibers including:
    a step of extruding using extrusion die means producing a transparent thermoplastic extrusion in the form of a row of fibers in a planar array, said fibers being closely spaced and parallel in a transverse direction and extending in a longitudinal direction of extrusion;
    a step of rolling using polished roller means including first and second polished rollers rolling the extruded fibers, at least one of said rollers having upstanding circumferential ribs matching the shape and spacing of the fibers, each rib of said first roller contacting the second roller and forming a geometrically-shaped channel imparting polished surfaces to the fibers having geometrically-shaped cross-sections.

3. A process for manufacturing optical fibers according to claim 1 or 2 in which the extrusion die means includes a first extruding die extruding said thermoplastic having an index of refraction and also includes a second extrusion die applying a co-extruded coating of plastic having an index of refraction lower than the index of refraction of the transparent sheet, said second extrusion die applying said co-extruded coating after the fibers have passed through the polished roller means.

4. A process for manufacturing optical fibers according to claim 1 or 2 in which the extrusion die means includes a first extrusion die producing said thermoplastic extrusion having an index of refraction; the polished roller means and then an applicator means for applying a coating of thermosetting plastic having an index of refraction lower than the index of refraction of the thermoplastic extrusion.

5. A process for manufacturing optical fibers according to claim 4 in which the applicator means applies a coating of thermosetting plastic which is cured by electromagnetic radiation.

6. A process for manufacturing optical fibers according to claim 5 in which said applicator means is disposed between the extrusion die and the polished roller means.

7. A process for manufacturing optical fibers according to claim 4 in which polished roller means comprises a first pair of polished rollers shaping and polishing the thermoplastic extrusion and a second pair of polished rollers shaping and polishing the thermosetting plastic.

8. A process for manufacturing optical fibers according to claim 1 or 2 in which the first and second rollers have adjacent ribs with concave transverse radii, whereby two adjacent ribs form a semi-circle and corresponding ribs of the first and second rollers form full circles, thereby producing separated fibers having circular cross-sections.

9. A process for manufacturing optical fibers according to claim 1 or 2 in which the first and second rollers have adjacent ribs of triangular cross sections, whereby two adjacent ribs form a flat-sided, flat-bottom channel in which corresponding ribs of the first and second rollers form a hexagon, thereby producing fibers having hexagonal cross-sections.

10. A process for manufacturing optical fibers according to claim 1 or 2 in which adjacent ribs of first and second rollers have spaced-apart concave transverse radii, whereby two adjacent ribs form a semi-oval and respective ribs of the first and second rollers form full ovals, thereby producing separated fibers having oval cross-sections.

11. A process for manufacturing optical fibers according to claim 1 or 2 in which the first roller is a polished cylinder and the second roller has adjacent ribs of triangular cross-section, whereby two adjacent ribs form a V-shaped channel and respective ribs of the first and second rollers form a triangle, thereby producing fibers having triangular cross-sections.

12. A process for manufacturing optical fibers according to claim 1 or 2 in which the first roller is a polished cylinder and the second roller has transversely spaced apart ribs of triangular cross-section, whereby two adjacent ribs form a flat-sided, flat-bottomed channel, thereby producing fibers having trapezoidal cross-sections.

13. A process for manufacturing optical fibers according to claim 3 in which the polished roller means imparting geometric shapes to the fibers, including parting lines; the extrusion die means including a first extruding die extruding core fibers having an index of refraction and also including a second extrusion die applying a co-extruded coating of cladding polymer having an index of refraction lower than the index of refraction of the core fibers; said second extrusion die including a plurality of polished entrance die apertures which loosely guide fibers into a cladding polymer, except along the parting lines imparted by the polished rollers, said parting lines being smoothed and polished by the entrance die apertures; and also including a plurality of exit dies larger than the fibers which apply a thin coating of cladding polymer to produce clad fibers.

14. A process for manufacturing optical fibers according to claim 1 or 2 in which at least one of the rollers has a textured surface providing a light-refracting and diffusing texture on at least one surface of a fiber.

* * * * *